US005581042A

United States Patent [19]

Tambini

[11] Patent Number: 5,581,042

[45] Date of Patent: Dec. 3, 1996

[54] METHOD FOR TORQUE WRENCH NON-CONTACT ANGLE MEASUREMENT

[75] Inventor: Angelo L. Tambini, Manor Kilbride, Ireland

[73] Assignee: Ingersoll-Rand Company, Woodcliff Lake, N.J.

[21] Appl. No.: 570,312

[22] Filed: Dec. 11, 1995

[51] Int. Cl.[6] .......... G02L 5/24

[52] U.S. Cl. .......... 73/862.21; 73/862.23

[58] Field of Search .......... 73/862.21, 862.22, 73/862.23, 761; 81/469, 471

[56] References Cited

U.S. PATENT DOCUMENTS 4,211,120 7/1980 Tambini .......... 73/761
4,262,528 4/1981 Holting et al. .......... 73/862.23
4,981,404 1/1991 Chamberlain et al. .......... 73/761 X
4,995,145 2/1991 Eshghy .......... 73/761 X
5,203,242 4/1993 Hansson .......... 81/469

*Primary Examiner*—Richard Chilcot
*Assistant Examiner*—Elizabeth L. Dougherty
*Attorney, Agent, or Firm*—Walter C. Vliet

[57] ABSTRACT

A method of utilizing a non-contact velocity sensor is disclosed which involves a subpoint set delay and reset feature as a means for minimizing problems with zero drift that would cause inaccuracies in tightening procedures.

5 Claims, 2 Drawing Sheets

METHOD FOR TORQUE WRENCH NON-CONTACT ANGLE MEASUREMENT

BACKGROUND OF THE INVENTION

This invention relates generally to measurement of angles turned in a threaded fastener tightening sequence and more particularly to a method of determining the angle with a non-contact reference. U.S. Pat. No. 4,211,120 issued to Angelo L. Tambini and assigned to SPS Technologies, Inc., and now Ingersoll-Rand Company, describes a tightening apparatus of a nature wherein the present invention finds application.

In the above identified prior art patent, which is incorporated herein by way of reference, a potentiometer 24 operates to provide an electrical output signal which is proportional to the rotational displacement of the driver head. A cable 26 and clip 28 is attached to a work piece to provide a fixed reference point.

In another embodiment, illustrated in FIG. 5, a digital angle measuring means 29 is disclosed. See column 3, lines 49 et. seq. The digital measuring means includes a high inertial disk as a reference. The fixed reference arm system is difficult to use, requires external fittings and increases both the size and complexity of the wrench head. Drift in the inertial disk non-contact reference created the possibility of accuracy problems and also added to the size, complexity, and cost of the wrench head. Recently angular velocity sensors, such as those supplied by the Ono-Sendai Corporation of San Francisco, Claif. and Murata Erie North American Inc. have become available. Mounting one of these on the wrench and integrating the signal will give a signal proportional to the angle turned by the wrench. The sensors, however, have problems with zero drift which cause inaccuracies in the term of a typical fastener tightening cycle.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a method for torque wrench non-contact angle measurement comprising the steps of:

(a) rotating a threaded fastener to a determined snug torque sufficient to stabilize the wrench;

(b) holding the wrench against the snug torque to confirm stability at zero rotation;

(c) rotating the wrench a predetermined number of degrees as sensed by a non-contact angular velocity sensor; and (d) stopping rotation upon sensing the predetermined number of degrees as a means of tightening the fastener. The foregoing and other aspects of the invention will become apparent from the following detailed description of the invention when considered in conjunction with the accompanying drawing figures.

BRIEF DESCRIPTION OF THE DRAWING FIGURES

DETAILED DESCRIPTION

Recently small angular velocity sensors have become available. Mounting one of these on the wrench and integrating the signal will give a signal proportional to the angle turned by the wrench. These sensors have problems with zero drift that will cause inaccuracies in the long term but can be overcome by using the torque signal to reset both the zero velocity signal and the integrator according to the present invention.

Figure 1:
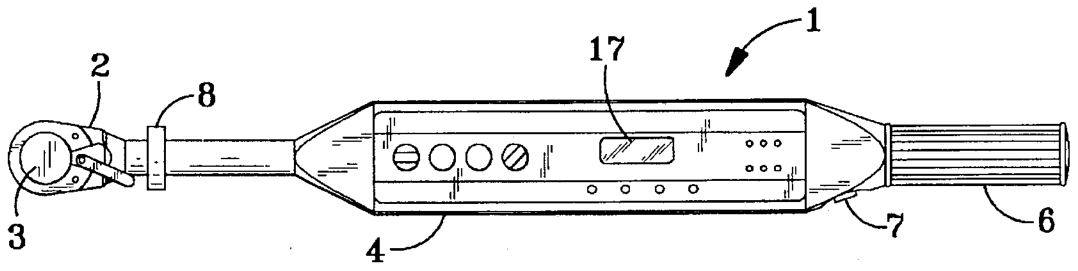
FIG. 1 is a top view of a torque wrench according to the present invention showing its essential elements.

Referring to FIG. 1, a torque wrench according to the present invention is generally shown and indicated by the reference numeral 1. The torque wrench is generally comprised of a ratchet head 2 having a velocity sensor 3 according to the present invention mounted on the ratchet head or any similar convenient place on the wrench which will rotate with the wrench during tightening.

The body of the wrench 4 contains the torque sensing and processing circuitry as well as the controls and displays required for wrench operation. A reset button 7 is located near the handle 6 for convenience of operation and a torque transducer 8 is provided to measure the torque output of the wrench.

Figure 2:
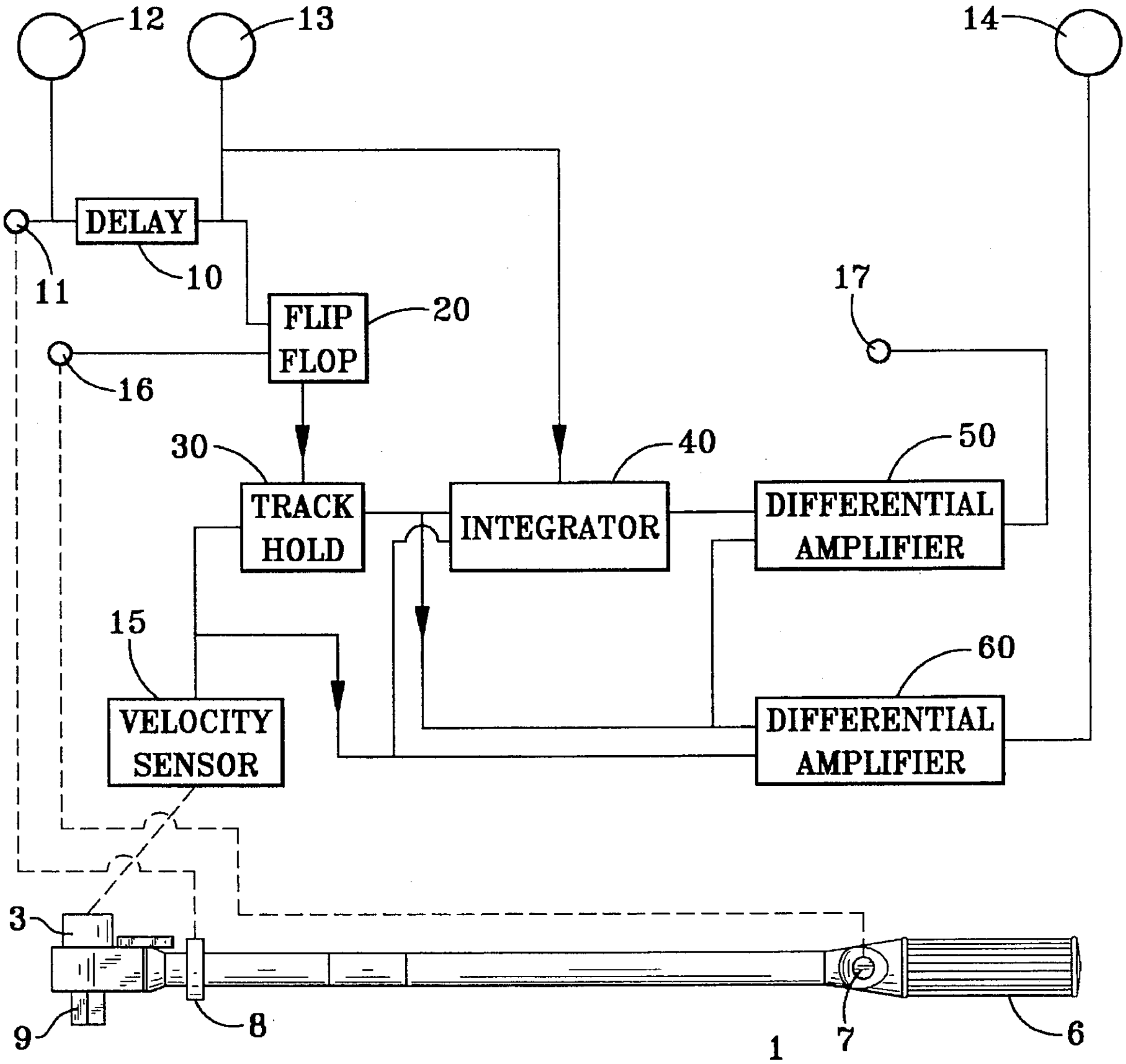
FIG. 2 is a schematic block diagram of a proposed circuit incorporated in a torque wrench to accomplish the present invention.
Figure 3:
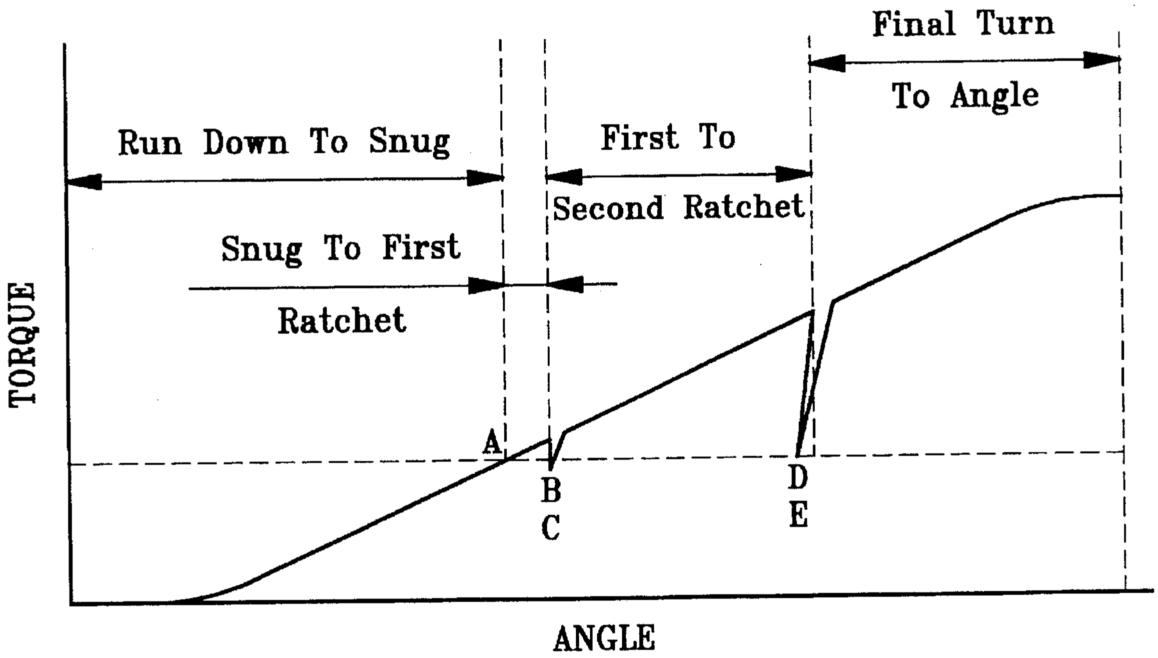
FIG. 3 is a torque vs. angle diagram showing a typical ratcheting tightening procedure according to the present invention.

Referring now to FIG. 2, the circuit shown is necessary to condition the signal from the velocity sensor 15 and present it to the wrench in a suitable form for subsequent processing. The velocity sensor 15 does not give a zero signal for zero velocity but a signal of approximately 2.5 volts which also drifts. As described in the referenced patent, the snug 11 and reset 16 signals are derived from the referenced patent wrench electronics and the snug indicator 12 already exists. The reset button 7 is the switch operation that switches on the wrench electronics and at the same time sets the zero on the torque readout 17. The snug torque is the torque level point from which the angle measurement is to be made. The angle signals for each segment of tightening are then combined or stitched together, as shown in FIG. 3, by the wrench electronics to give a readout of total angle turned by the wrench during the tightening process. The torque readout window may also be utilized to display the total angle rotated by the fastener after the snug torque is achieved.

In operation, the following steps are accomplished:

(1) The bolt is rundown and prior to commencing the actual tightening, the wrench is held loosely not applying torque while the reset button 7 is pressed. This switches on the wrench electronics and the Track and Hold circuit 30 is set to allow the velocity reference signal to follow the velocity signal. The integrator is held at zero.

(2) The tightening is continued until the snug point is reached. This is indicated on the wrench and the operator must then stop and hold the wrench as stationary as possible on the joint at the applied snug torque until the delayed snug 13 is indicated, as determined by delay 10. At this point the set reset Flip Flop 20, switches to isolate the velocity reference signal and maintain it at this particular level and the integrator 40 is activated so that any future changes in the velocity signal are integrated. The Differential Amplifier 50 then adjusts the level of this signal to make it compatible with the wrench electronics. This will process the signal and indicate if the required angle has been achieved. If not, the wrench will need to be ratcheted to achieve the total angle.

(3) During ratcheting the torque is reduced prior to moving the wrench in the reverse direction. As soon as the torque is reduced below snug the integrator is held at zero as the wrench movements now do not contribute to the tightening of the bolt.

When the wrench is moved forward in the tightening direction and the actual tightening is restarted, the same sequence of actions must be carried out by the operator as was done during the first stage. When snug is indicated by the snug indicator 12 the wrench must be held still until the delayed snug indication 13 is given before the tightening is restarted and the wrench rotated for a selected number of degrees. For convenience of operation the wrench may be ratcheted back and forth counting only the degrees of forward rotation to complete the tightening sequence, however, the wrench must be held still prior to repeat ratchets for optimum precision.

In many cases, adequate angle readings may be obtained by zeroing only for the first ratchet. The results obtained for ratcheting operation may be stitched together for each segment as generally described in the referenced patent and depicted for the angle sequence herein described in FIG. 3.

(4) The Diffential Amplifier 60, motion indicator 14, and angle signal 17 are included as operator aids. The motion indicator 14 enables the operator to check that the wrench actually is stationary as the delayed snug indicator 13 comes on. The motion indicator 14 must be off before restarting the tightening process. The angle signal 17 indicates completion of the tightening cycle.

FIG. 3 shows the initial run-down of the tightening sequence to a snug torque at point A at which point the hold stable delay takes place. A first ratcheting sequence is shown at point BC and a second at DE followed by completion of the sequence upon achieving the desired total angle of rotation after the snug point.

Having described my invention in terms of a preferred embodiment, I do not wish to be limited in the scope of my invention except as claimed.

What is claimed is:

1. A method of fastener tightening utilizing a reciprocation ratcheting hand held wrench comprising the steps of:

(a) rotating a threaded fastener by ratcheting the wrench to a determined snug torque sufficient to stabilize the wrench;

(b) holding said wrench against said snug torque to confirm stability at zero rotation;

(c) rotating said wrench a predetermined number of degrees as sensed by a non-contact angular velocity sensor by ratcheting rotation after achieving snug torque, and stitching together angle results until arrival at step (d) is achieved; and (d) stopping rotation upon sensing the predetermined positive number of degrees tightened past snug torque as a means of tightening the fastener.

2. A method of fastener tightening according to claim 1 comprising the additional steps of:

(e) sensing both clockwise and counterclockwise rotation; and (f) algebraically summing the rotation sensed until arrival at step (d) is achieved.

3. An apparatus for fastener tightening by means of a reciprocation hand held ratcheting wrench comprising:

(a) means for rotating a threaded fastener to a determined snug torque sufficient to stabilize the wrench;

(b) means for holding said wrench against said snug torque to confirm stability at zero rotation;

(c) means for rotating said wrench a predetermined number of degrees as sensed by a non-contact angular velocity sensor by means for ratcheting rotation after achieving snug torque, and means for stitching together angle results until arrival at step (d) is achieved; and (d) means for stopping rotation upon sensing the predetermined positive total number of degrees tightened past snug torque as a means of tighening the fastener.

4. An apparatus for fastener tightening according to claim 3, further comprising:

(e) means for sensing both clockwise and counterclockwise rotation;

(f) means for algebraically summing the rotation sensed until a predetermined number of degrees of tightening rotation have been achieved; and (g) means for indicating the total tightening rotation angle after snug.

5. An apparatus for fastener tightening according to claim 4 wherein:

said means for indication the total tightening rotation angle after snug further comprises and audible stop signal.

* * * * *